No. 873,819. PATENTED DEC. 17, 1907.
L. J. WING.
LIQUID POWER TRANSMISSION APPARATUS.
APPLICATION FILED MAR. 30, 1906.

4 SHEETS—SHEET 1.

WITNESSES.
INVENTOR
Leander J. Wing

No. 873,819. PATENTED DEC. 17, 1907.
L. J. WING.
LIQUID POWER TRANSMISSION APPARATUS.
APPLICATION FILED MAR. 30, 1906.

4 SHEETS—SHEET 4.

WITNESSES
Frank G. Parker
John Buckler

INVENTOR
Leander J. Wing

UNITED STATES PATENT OFFICE.

LEANDER J. WING, OF LEXINGTON, MASSACHUSETTS, ASSIGNOR TO HYDRAULIC POWER CONTROLLER COMPANY, OF PORTLAND, MAINE.

LIQUID-POWER-TRANSMISSION APPARATUS.

No. 873,819.

Specification of Letters Patent.

Patented Dec. 17, 1907.

Application filed March 30, 1906. Serial No. 309,002.

*To all whom it may concern:*

Be it known that I, LEANDER J. WING, a citizen of the United States, of Lexington, in the county of Middlesex and State of Massachusetts, have invented a new and useful Improvement in a Liquid-Power-Transmission Apparatus, of which the following, taken in connection with the accompanying drawings, is a specification.

My invention relates to an apparatus for transmitting power from a motor to the mechanism to be driven, and is so devised that as much or as little of the power of the motor may be transmitted as may be desired, and that the direction of motion of the driven mechanism may be direct or reversed, the object being to avoid friction and noise and to produce a simple easily-operated transmitter. This object I attain by the mechanism illustrated in the accompanying drawings in which—

Figure 1:
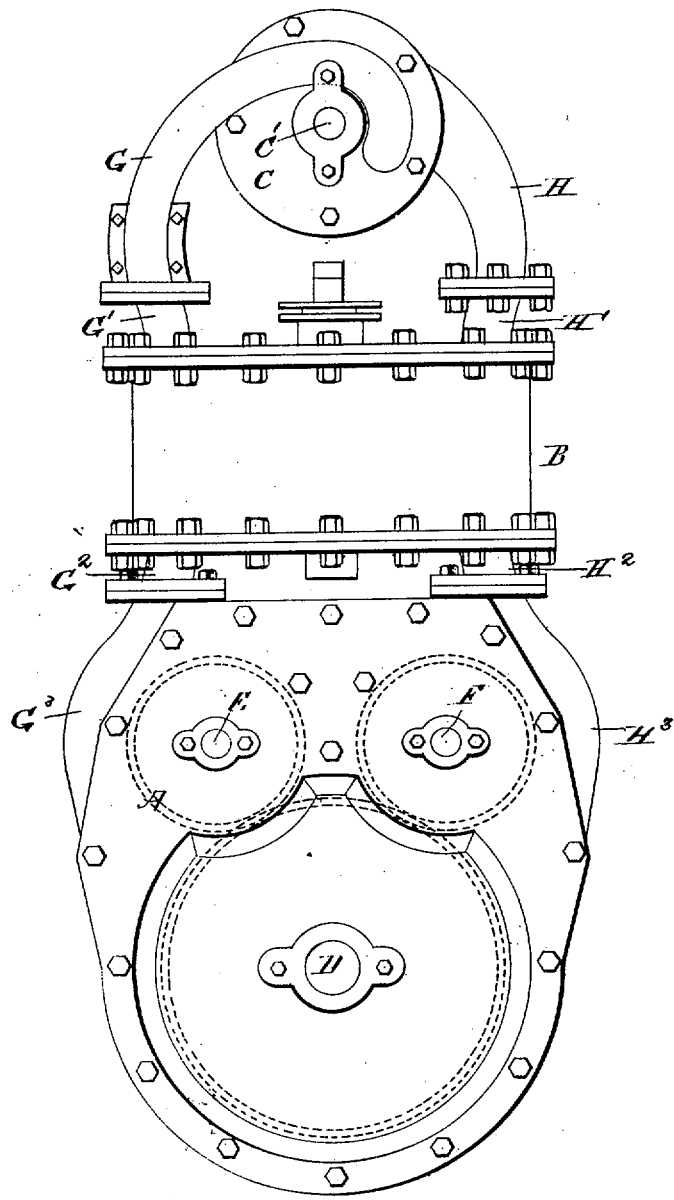
Figure 2:
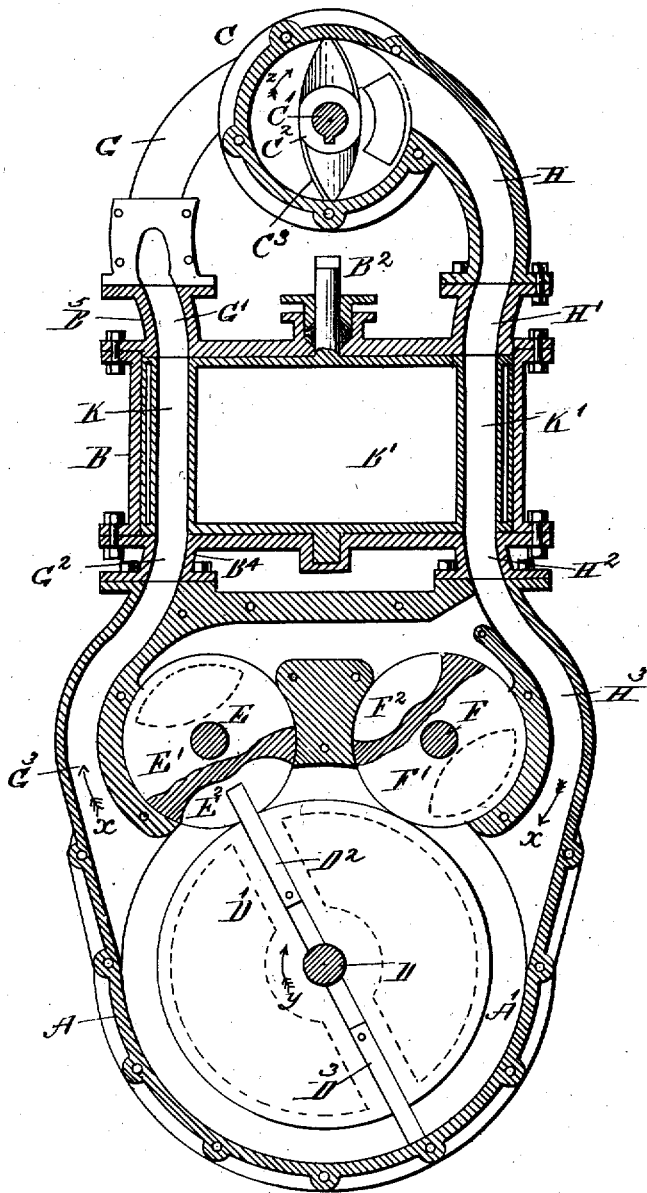
Figure 3:
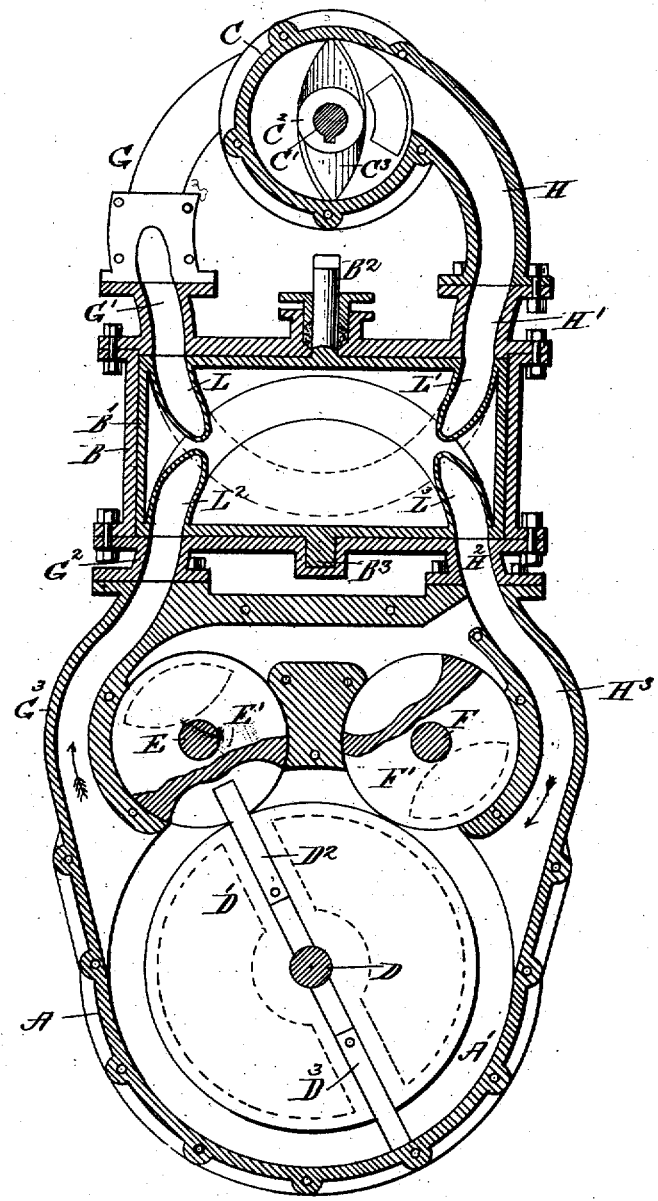
Figure 4:
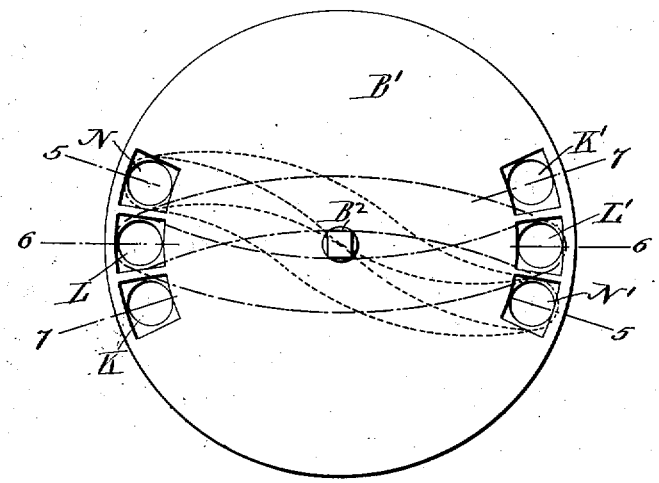
Figures 5, 6:
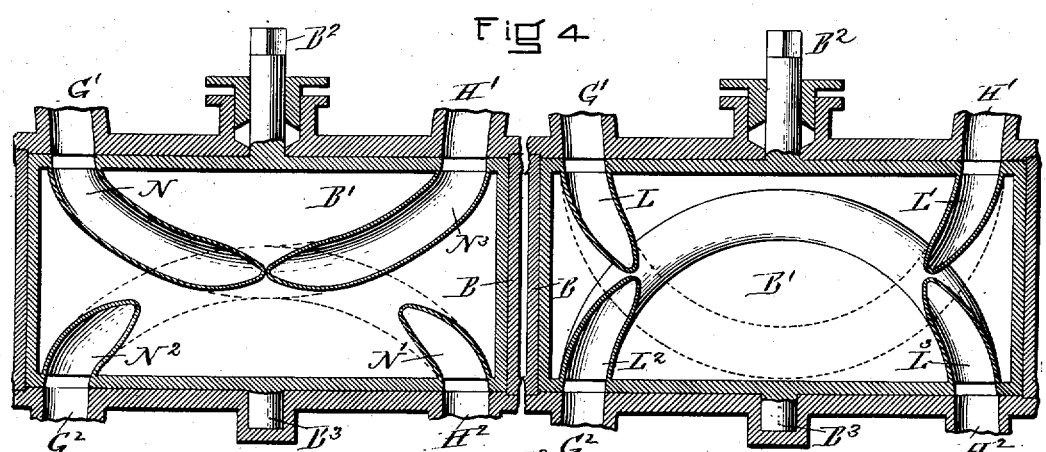
Figure 7:
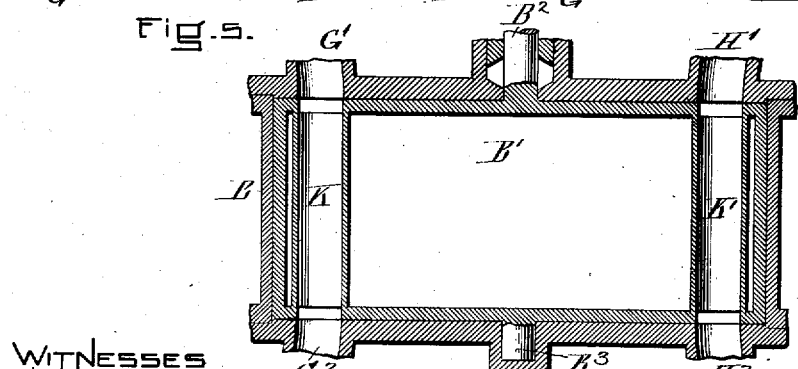

Figure 1 is a plan view showing the apparatus complete. Fig. 2 is a horizontal section showing the interior construction, but omitting the indirect port-ways, showing the direct port-ways only. Fig. 3 is a horizontal section showing the interior construction omitting the direct port-ways and showing the neutral port-ways also omitting the other port-ways. Fig. 4 is a plan showing the system of ports and port-ways and the rotatable port-way carrier. Fig. 5 is a section through the port-way carrier taken on line 5—5 of Fig. 4. Fig. 6 is a section through the port-way carrier taken on line 6—6 of Fig. 4. Fig. 7 is a section of the port-way carrier taken on line 7—7 of Fig. 4.

In the drawings the inclosing case is shown as made in three parts as follows: The part A, Fig. 1, contains the transmitting motor that drives the working shaft D, that is, the shaft that communicates motion to the working agent directly or indirectly, for instance, in case this device is used in connection with a propeller for a boat, the shaft D is connected directly to the propeller or indirectly by any of the usual methods, and in case the apparatus is used in connection with an automobile, then the shaft D will give motion directly or indirectly to the driving axle; other cases will suggest themselves. The part of the casing A also contains the rotating buttress the shafts of which are indicated by E and F, as will be fully explained hereinafter.

The part B of the case contains the rotating drum that in turn contains the ports and port-ways. The parts $B^4$ and $B^5$ act as coupling pieces, and in certain uses may serve to connect the part C directly to the part A, in which event the part B is not used at all.

The part C of the case contains the liquid driving-device and is connected by the shaft $C^1$ to the prime motor, which may be of any class.

The agent of transmission being liquid in this apparatus, I will describe the form of pump used for the purpose of causing a circulation of the liquid through the different parts of the apparatus. The case C has within it a centrally located shaft $C^1$ which receives motion from the prime motor and has keyed to it a hub $C^2$, Fig. 2, from which two concaved pistons $C^3$ and $C^3$ extend, as shown in the drawing. These curved pistons are not of the propeller type, but are simply curved as they extend radially from the hub. The rapid rotation of these pistons in the direction of the arrow will draw in the liquid through the pipe G and force it out through the pipe H. The circulation of the liquid is as follows: After leaving the pump chamber C, it passes through the pipes H and $H^1$ to the port-ways in case B, thence through the pipes $H^2$ and $H^3$ to the transmitting motor in the case A. After driving the transmitter motor the liquid passes out through the pipes $G^3$ and $G^2$ to the port-ways in the case B, thence through pipes $G^1$ and G back to the pump in the case G.

The transmitter motor may be described as follows; referring to Fig. 2: A circular chamber $A^1$ is formed in the part A of the case, in the center of which a piston-carrying drum $D^1$ is mounted upon the shaft D, which, as has been explained, communicates motive power to the mechanism to be driven. The said drum $D^1$ has two radially located pistons $D^2$ and $D^3$ constructed to rotate, as nearly fluid-tight as possible, in the circular chamber $A^1$ and adapted to be driven by the liquid that enters through the pipe or passage $H^3$ and passes out through the passage $G^3$. The buttresses $E^1$ $F^1$ for the motor pistons $D^2$ $D^3$ are circular and are mounted upon shafts E and F. The diameters of the circular buttresses are each one-half of the diameter of the piston-carrying drum $D^1$, and the several shafts D, E and F are so connected by gears, indicated by dotted lines in Fig. 1, that their peripheral velocities shall be the same, and that there will be no frictional resistance between the buttresses E¹ F¹ and the piston-carrying drum D as they rotate in contact with each other.

The rotating buttresses E¹ and F¹ are each made with a recess E² and F² to admit of the passage of the ends of the piston D² and D³. The parts are all so turned that the piston end will work correctly in the recesses E² and F². It will be observed that the piston ends do not fit closely into the recesses but leave a passage for the liquid, so that no "pocket" or pack of the liquid can take place between the end of the advancing piston (D² for instance) and the rotating buttress.

A very essential and distinctive feature of my invention, is the device that I have made for directing and controlling the flow of the liquid that is used for transmitting the power. This device is more particularly shown in Figs. 4, 5, 6 and 7, and consists of a rotatable drum B¹ within the case B, and having a shaft B² by which it may be turned so as to cause the port-ways to coincide with the ports or terminals of the liquid transmission pipes G¹ H¹ and G² H². The drum B¹ has also a short shaft or journal B³ upon which it turns. For convenience in referring to this drum B¹ it will be termed the port-way carrier.

The port-ways may be formed by cores, in which case the carrier B¹ would be of cast metal; but the way that is illustrated in the drawing is to form the port-ways of metal pipes straight or bent to the required form. When the port-ways are straight as shown at K and K¹ Figs. 2 and 7, and the pump piston C³ rotates in the direction of the arrow Z, Fig. 2, then the transmitting liquid is forced in the direction of the arrows X,—X, and the transmitter motor is to rotate in the direction of the arrow Y. When it is desired to stop the transmitter motor without stopping the pump, the port-way carrier B is turned so that the port-ways L L¹ and L² L³, see Fig. 6, coincide respectively with the terminals of the pipes G¹ H¹ and G² H², that is the liquid passes from the pump through the pipes H H¹ through the port-way L L¹, Fig. 6, direct to the pipes G¹ G and back to the pump not flowing to the transmitter motor at all. In this case the liquid that may for a while continue in motion before the transmitter motor stops will simply pass through the pipe G² G², Fig. 2, to the port-way L² L³, Fig. 6, thence by the pipes H² H³ back to the transmitter motor, having no effect except to retard the said motor which will soon stop.

To reverse the direction of rotation of the transmitter motor, the port-way carrier B¹ is turned so that the port-ways N N¹, Fig. 5, will coincide with the pipes, G¹, H² and the port-ways N³ N² will coincide with the pipes H¹ G² sending the liquid current through the transmitter motor in a direction opposite to that indicated by the arrows X, X and causing the motor to turn in a direction opposite to the arrow Y, see Fig. 2.

From the above it is obvious that by turning the port-way carrier the transmitter motor may be made to turn in either direction, and also that it may be gradually started or stopped.

In starting the pump the rotating pistons will simply cause the contained liquid to move round and round in the pump case, but as the speed increases the centrifugal action sends the liquid into the pipe H, and thence through the pipes and port-ways back to the inflowing side of the pump, acting on the transmitting motor in its passage.

Although I have described a rotary driving pump and a transmitter motor, I do not wish to confine myself to any particular kind of pump or motor, as my transmission valve or port-way carrier is the feature that I wish to secure as my invention when used in this connection.

It will be observed that my port-way carrier not only acts as a multiple port-way carrier, but also as a rotary valve, and that I have in a single device, having but one actuating lever, a multiple port-way carrier and a multiple valve operator; and that this simple device furnishes port-ways and valves that provide for all currents; i. e., the out and in current for the direct action; the out and in currents for the reverse action, and also the neutral current which is without any obstructing angles or chambers for disturbing eddy currents.

Another advantage of my port-way carrier and valve device is that in turning the carrier it is impossible to open the ports for the reverse action until the neutral ports have been opened and the direct action ports closed, and the reverse of this is true; therefore there can be no interference of currents or strain on any part of the apparatus.

Claim.

In a liquid transmitter apparatus; a pump whereby a current of liquid is forced into passages leading to and from the pump, and mediately to and from a motor, the said current of liquid imparting energy to the said motor; a current controlling device comprising a rotable port-way carrier, and means for operating it, the said carrier having ports at each end constructed to register with the terminals of the said current passages; and having port-ways constructed to connect the passages between the said pump and said motor which cause the liquid to pass in the direct or reverse motion and also give neutral passages for the current both from the pump and from the motor, the said ports which register with the terminals of the current ways being separated by a thin partition only, whereby it is impossible to close one without opening another, thereby preventing any shock or strain on any part of the apparatus, substantially as and for the purpose set forth.

In testimony whereof, I have signed my name to this specification in the presence of two subscribing witnesses, on this 5th day of March A. D. 1906.

LEANDER J. WING.

Witnesses:
 FRANK G. PARKER,
 JOHN BUCKLER.